United States Patent [19]

Fox et al.

[11] Patent Number: 4,818,732

[45] Date of Patent: Apr. 4, 1989

[54] HIGH SURFACE AREA CERAMICS PREPARED FROM ORGANOSILANE GELS

[75] Inventors: Joseph R. Fox, Solon; Douglas A. White, Cleveland Heights, both of Ohio

[73] Assignee: The Standard Oil Company, Cleveland, Ohio

[21] Appl. No.: 27,765

[22] Filed: Mar. 19, 1987

[51] Int. Cl.$^4$ ............................................. C04B 38/02
[52] U.S. Cl. ..................................... 501/81; 501/84; 501/88; 264/65
[58] Field of Search ................ 501/81, 84, 88; 528/10; 423/345; 264/65, 66

[56] References Cited

U.S. PATENT DOCUMENTS

| | | | |
|---|---|---|---|
| Re. 31,447 | 11/1983 | Baney et al. | 264/65 |
| 3,856,539 | 12/1974 | Mallow et al. | 501/84 |
| 3,947,550 | 3/1976 | Fitchmun | 501/88 |
| 4,041,117 | 8/1977 | Prochazka | 264/63 |
| 4,097,294 | 6/1978 | Rice et al. | 501/88 |
| 4,154,787 | 5/1979 | Brown | 501/88 |
| 4,238,434 | 12/1980 | Enomoto et al. | 501/88 |
| 4,298,559 | 11/1981 | Baney et al. | 501/88 |
| 4,414,403 | 11/1983 | Schilling et al. | 501/88 |
| 4,497,787 | 2/1985 | Schilling et al. | 501/88 |
| 4,564,496 | 1/1986 | Gupta et al. | 501/88 |
| 4,608,242 | 8/1986 | Schilling et al. | 501/88 |
| 4,626,556 | 12/1986 | Nozue et al. | 522/99 |
| 4,639,501 | 1/1987 | Seyferth et al. | 501/88 |
| 4,657,843 | 5/1987 | Fukuyama et al. | 430/323 |
| 4,690,811 | 9/1987 | Kida et al. | 423/345 |
| 4,694,040 | 9/1987 | Hashimoto et al. | 524/765 |

FOREIGN PATENT DOCUMENTS

| | | | |
|---|---|---|---|
| 171858 | 8/1985 | European Pat. Off. | 501/88 |
| 3516587 | 12/1985 | Fed. Rep. of Germany | 501/88 |
| 60-264365 | 12/1985 | Japan | 501/88 |
| 61-14171 | 1/1986 | Japan | 501/88 |
| 61-10068 | 1/1986 | Japan | 501/88 |
| 61-17472 | 1/1986 | Japan | 501/88 |
| 61-53163 | 3/1986 | Japan | 501/88 |
| 61-83689 | 4/1986 | Japan | 501/88 |
| 61-91076 | 5/1986 | Japan | 501/88 |

OTHER PUBLICATIONS

White, et al., Chemical Abstracts, vol. 106, Abstr. No. 161233x and 161224y (1987).

*Polycarbosilane Precursors for Silicon Carbide*, Schilling, Wesson and Williams, Ceramic Bulletin, v. 62, #8 (1983), pp. 912–915.

D. A. White, S. M. Oleff, R. D. Boyer, P. A. Budinger and J. R. Fox "Preparation of Silicon Carbide from Organosilicon Gels: I, Synthesis and Characterization of Precursor Gels" Advanced Ceramic Materials, vol. 2, No. 1 (1987).

D. A. White, S. M. Oleff and J. R. Fox "Preparation of Silicon Carbide from Organosilicon Gels: II, Gel Pyrolysis and SiC Characterization" Advanced Ceramic Materials, vol. 2, No. 1 (1987).

J. R. Fox, D. A. White, S. M. Oleff, R. D. Boyer and P. A. Budinger "Pyrolysis of Organosilicon Gels to Silicon Carbide" Mat. Res. Soc. Symp. Proc., vol. 73, Materials Research Society (1986).

*Primary Examiner*—William R. Dixon, Jr.
*Assistant Examiner*—Andrew B. Griffis
*Attorney, Agent, or Firm*—J. G. Curatolo; L. W. Evans

[57] ABSTRACT

High surface area open microporous, partially crystalline, partially amorphous, solid ceramic materials containing silicon carbide with or without silica with or without carbon may be prepared by controlled pyrolysis of $(RSiO_{1.5})_n$ gels in an inert atmosphere. The silica and carbon content, surface area, and pore size and distribution may be altered by optional subsequent processing steps to selectively remove carbon and/or silica.

8 Claims, No Drawings

HIGH SURFACE AREA CERAMICS PREPARED FROM ORGANOSILANE GELS

The present invention is directed to the synthesis of high surface area silicon carbide/silica/carbon solid ceramic materials. More particularly, the present invention relates to synthesis of high surface area silicon carbide/silica/carbon materials from gels in which the carbon necessary to convert the silicon into silicon carbide is contained within the organosilane gel precursor. Due to their ceramic nature, these materials may be useful as a catalyst support at temperatures where other catalyst support materials undergo a rapid loss in surface area. For example, it is anticipated that the materials of this invention may function as a high surface area catalyst support material or catalyst at temperatures up to and even above 1000° C. The materials of this invention may also be useful in the manufacture of ceramic filters or membranes or ceramic foams.

The foregoing abstract is not to be taken as limiting the invention of this application. In order to understand the full nature and extent of the technical disclosure of this application, reference must be made to the accompanying detailed description.

BACKGROUND OF THE INVENTION

Known catalyst support materials include zeolite materials. Such zeolites typically degrade at temperatures less than or equal to 700° C. with collapse of pore structure and loss of surface area.

The preparation of sub-micron silicon carbide powders that are suitable for fabrication of structural ceramic bodies by pressure or pressureless sintering processes is described in many references. Wei, Morgan, Kennedy, and Johnson, *Synthesis, Characterization and Fabrication of Silicon Carbide Structural Ceramics*, Annual Conference Material Coal Conversion Utility (Process) 7, 187 (1982), describe a variety of sol-gel routes to synthesis of silicon carbide powders. These routes include synthesis of silicon carbide by gelation of colloidal silica with petroleum pitch and toluene and by polymerization of methyl trimethoxysilane and phenolic resin in alcohol and water. Preparation and characterization of these sols and resulting silicon carbide powders is also described in Wei, Kennedy and Harris, *Ceramic Bulletin*, volume 63, pages 1054–1061 (1984). After pyrolysis of the gels at from 500° C. to 800° C. they are reacted at 1600° C. under argon in a graphite furnace to form fine silicon carbide powders which are typically oxidized at 550° C. to 600° C. in air to remove excess carbon and treated with hydrofluoric acid to eliminate residual silica. The resulting powders exhibited surface areas of up to 59 $m^2/g$ due to their submicron particle size.

Japanese patent publication J-58091-027-A discloses the manufacture of silicon carbide powder by reducing at 1400° C. to 1850° C. a mixture of carbon and silicon dioxide powders and thereafter calcining in a non-oxidizing atmosphere. Methylsilicate ($CH_3SiO_{1.5}$) is obtained by hydrolysis of methyltrichlorosilane. To this is added carbon powder, for example, carbon black, graphite, lampblack, or resin capable of resulting in carbon upon calcination.

Japanese patent publication J-58091-028-A discloses manufacture of silicon carbide powder having a fine grain size which may employ as its silica source trimethylchlorosilane which includes the group ($CH_3SiO_{1.5})_n$. In this case there is also added an external carbon source to the gel prior to preparation of the desired silicon carbide powder, which should be less than 0.5 micron.

Japanese patent publication No. J-58091-026-A describes preparation of high purity silicon carbide powder by mixing Si alkoxide, e.g., ethylsilicate or methylsilicate, and a carbonaceous substance, e.g., amorphous carbon, graphite, carbohydrates such as fructose, sucrose, starch or cellulose with aqueous solution of acid or alkali at 20° C.–80° C. to form a gel; drying the gel at 80° C.–200° C. for several hours, and subsequently calcining at 1300° C.–1800° C. under a non-oxidizing atmosphere.

Japanese patent publication No. J-57017-412 describes the preparation of finely powdered metal carbides having a grain size less than 1 micron which are prepared by reacting metal halide or alkoxide with carbohydrates such as glucose, gelactose, arabinose, saccharose, starch, cellulose, etc., and calcining the resultant at 700° C.–2300° C. for 1–3 hours. Examples of suitable metal alkoxides include tetramethoxysilane, tetraisopropoxysilane, dimethyl diethoxysilane, tetraethoxyZirconium, tetra-n-butoxyZirconium, dicholoro-tri-n-propoxyTantalum and dichlorotetraethoxyTungsten.

European patent publication No. 0052487 describes a method for manufacture of silicon carbide using liquid silicic acid or modified liquid silicic acid as a siliceous substance and carbon in powdered form, a precursor of carbon in a powdered form, or a precursor or carbon in the form of a solution, which are combined in the range of 0.3 to 5 parts per weight of carbon or precursor of carbon to liquid silicic or modified liquid silicic acid. Gelling is to be avoided prior to bringing the two substances into a homogenous liquid state. After combination, the precursor material may be dried or directly subjected to heat or precipitated. Thereafter, the mixture is heated in a non-oxidative atmosphere at temperatures of 1350° C. to 1850° C. to form silicon carbide particles of submicron diameter.

Cannon, Danforth, Haggerty and Marra, in an article entitled "Sinterable Ceramic Powders From Laser-Driven Reactions: II Powder Characteristics and Process Variables", *Journal of American Ceramic Society*, volume 65, No. 7, pages 330–335 (1982) describe laser-driven reactions of $SiH_4$ and $C_2H_4$ to produce silicon carbide powders of less than 1/10 micron particle size, having a surface area between 84 and 97 $m^2/g$.

The preparation of ultrafine, ultrapure silicon carbide powder has been achieved using plasma-assisted chemical vapor deposition from reactant gases $SiH_4$ and $CH_4$. This work is described in an article entitled "RF-Plasma System For The Production of Ultrafine/Ultrapure SiC Powder" published by Basic Science Division of the American Ceramic Society, authored by Hollabaugh, Hull, Newkirk and Petrovik of Los Alamos National Laboratory.

U.S. Pat. No. 4,460,639 discloses preparation of fiber-reinforced glass matrix composites in which pyrolyzed $(RSiO_{1.5})_n$ acts as the matrix. $(RSiO_{1.5})_n$ gels may also be expressed as organosilsesquioxane. According to this patent, gels were typically pyrolyzed at temperatures of less than or equal to 1200° C. Formation of silicon carbide is not indicated.

Andersson and Warren, in an article entitled, "Silicon Carbide Fibers and Their Potential Use in Composite Materials, Part I", *Composites*, volume 15, pages 16–24, indicate silicon carbide fibers have been prepared by controlled pyrolysis of polycarbosilane polymers melt-spun into fiber form. The commercial production of these fibers was begun by Nippon Carbon Company under the trade name Nicalon in 1981. The chemistry involved in the preparation of these fibers is as follows:

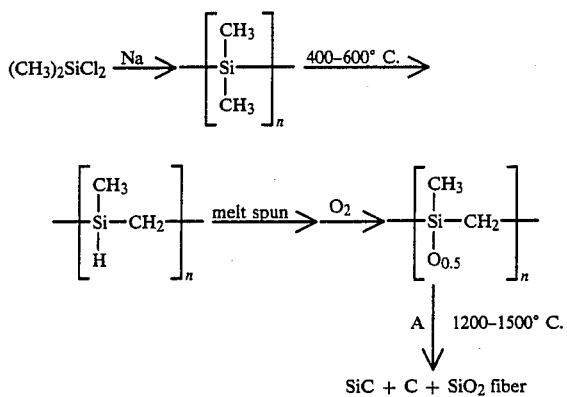

Such fibers may be characterized as a partially amorphous, partially crystalline mixture of silicon carbide, silica and carbon. Pyrolysis temperatures of 1300° C. or less in hydrogen or vacuum are employed. The result is the formation of a low surface area, low porosity fibrous material having attractive mechanical properties. Pyrolysis at higher temperatures is considered undesirable due to loss of mechanical properties. Of particular concern is carbothermic reduction of silica by carbon resulting in carbon monoxide evolution. It is stated that up to at least 1500° C., the reaction is expected to affect mainly the fiber surface and that significant rates are not observed below about 1200° C., even in the most reactive systems.

DETAILED DESCRIPTION OF PREFERRED EMBODIMENTS

Unless otherwise specified at the point of use, all compositions, percentages, weights and fractions in this specification and the appended claims are expressed on a weight basis.

According to the present invention, there is provided an open microporous high surface area ceramic material and a method for making same. The major constituent of the ceramic material is silicon carbide. The method includes controlled pyrolysis of Si—and—C—containing gels synthesized from tri-functional silanes of the formula $RSiX_3$ wherein X is a hydrolyzable group such as alkoxy or chloro. The carbon necessary for the synthesis is internal to the $RSiX_3$ silane. No external carbon source e.g. sucrose or carbon black is required.

The mechanism which results in the formation of the desired products according to the present invention may be characterized as follows: the $(RSiO_{1.5})_n$ gels pyrolytically decompose, beginning at temperatures of approximately 400° C., to give an intimate mixture of carbon and silica which subsequently react at the elevated temperature (>1000° C.) to produce silicon carbide. The unsaturated R groups tend to yield more carbon upon gel decomposition than saturated R groups having the same number of carbon atoms. The formation of silicon carbide proceeds via carbothermic reduction of silica by carbon. Carbon monoxide is produced as a gaseous by-product. When more carbon is present, the reduction proceeds further, and more silicon carbide and carbon monoxide are formed. Evolution of the carbon monoxide gas leads to porosity, which is responsible for the high surface area. Because silicon carbide is much denser than the precursor dried gel, the formation of silicon carbide may of itself be responsible for the development of porosity. In any event, formation of a finely divided silicon carbide powder of micron or submicron particle size was not observed. For this reason, it is believed that porosity and not small particle size is reponsible for the high surface areas observed. Attempts to purify the fired product by sequential oxidation and acid treatment have not resulted in production of a silicon carbide material which can be pressureless sintered in known manner.

If sufficient carbon is present in the gel for the reaction which results in formation of silicon carbide to proceed nearly to completion, a highly porous high surface area material is formed, i.e., when R is phenyl. Phenyl is preferred because it contributes the necessary amount of carbon in a form which is not readily volatilized away from the reaction site, as is believed to occur when alkyl groups are employed.

Synthesis of Gel

Suitable gels have the idealized formula $(RSiO_{1.5})_n$ but can contain residual hydroxy groups and/or alkoxy groups when alkoxy silanes are used. The crosslinking provided by the $(RSiO_{1.5})_n$ units is important for obtaining a reasonable yield from pyrolysis. Suitable gels may be synthesized in any of three ways: base-catalyzed hydrolysis and condensation of an alkoxysilane, acid-catalyzed hydrolysis followed by base-catalyzed condensation of an alkoxysilane, or hydrolysis of a chlorosilane. The nature of the R group dictates which synthesis route is best. In general, if alkoxysilanes are employed, the acid-base procedure is preferred due to more efficient hydrolysis of the alkoxy groups.

In the base-catalyzed route, the first step is hydrolysis of $RSi(OR')_3$ with sufficient amount of water for complete hydrolysis, i.e., to generate the corresponding hydroxide $RSi(OH)_3$. In reality, partial hydrolysis to produce $RSi(OH)_{3-x}(OR')_x$ may occur at this stage. These partially hydrolyzed alkoxides may still undergo gelation. As such, substoichiometric amounts of water, i.e., $H_2O$/silane $<3$, may be used particularly in view of the fact that $H_2O$ is also a by product of condensation reactions between two Si—OH groups to form Si—O—Si units. Gel formation is thereafter catalyzed by controlled addition of concentrated aqueous ammonium hydroxide solution. When the alkoxide is $C_6H_5(OCH_3)_3$, gel formation occurs rapidly when the pH is increased to between 9 and 10. When the base-catalyzed route is employed, the hydrolysis and gelation steps may be combined simply by adding concentrated aqueous $NH_4OH$ directly to $RSi(OR')_3$. However, in this instance, gel formation usually takes a greater period of time. The resulting gel is of a glassy nature and is more difficult to handle in subsequent process steps. For this reason, initial hydrolysis as a step distinct from subsequent base-catalyzed gelation is preferred. While concentrated aqueous $NH_4OH$ is preferred, other bases may be employed to induce gelation. For example, low molecular weight amines such as $CH_3NH_2$, $CH_3CH_2NH_2$ and $NH_2CH_2CH_2NH_2$, or inorganic bases such as NaOH or $Na_2CO_3$—, may be used provided the metallic impurity is acceptable in the final product.

The acid-base route of synthesis of a suitable gel is accomplished by acid-catalyzed hydrolysis of RSi-(OR)$_3$ with H+/H$_2$O followed by base-catalyzed gelation with, for example, ammonium hydroxide. Concentrated hydrochloric acid added dropwise is the preferred manner of effecting acid-catalyzed hydrolysis of the alkoxysilane although other acids, e.g. HNO$_3$, CH$_3$COOH may be used.

The chlorosilane route to synthesis of a suitable gel begins with hydrolysis of RSiCl$_3$ with water, resulting in HCl formation, which thereupon acid catalyzes gelation. Extreme caution should be employed when utilizing this synthesis route because the exothermic reaction of the chlorosilane with water can be quite vigorous. The violence of the hydrolysis reaction may be reduced by prior dilution of the chlorosilane with an inert solvent such as methylene chloride or methanol, although this is not a required step. Methylene chloride was employed in the examples herein. Dissolution of the trichlorosilane in methanol converts a fraction of the chloro groups to methoxy groups. Thereafter, water is added and gel formation and HCl evolution occur immediately. In this synthesis route, hydrolysis of the chloro and/or methoxy groups occurs to give hydroxyl groups which readily undergo acid-catalyzed gel formation due to the presence of the in-situ-liberated HCl.

R$_2$SiO units may be incorporated into the gel by additionally using a silane such as (CH$_3$)$_2$Si(OCH$_3$)$_2$ and the acid-base procedure. The trifunctional silanes still provide the crosslinking necessary to provide a decent pyrolysis yield.

Pyrolysis of the Gel

The gel which results when any of the three above-described synthesis routes is employed is usually of a wet nature. Prior to high-temperature firing, the wet gel is dried. Drying may be accomplished by exposing the gel to air in the temperature range of 100° C.–150° C. for several hours. The rate of drying may be accelerated by applying vacuum. Freeze drying of the gel is also acceptable.

Pyrolysis is conducted under vacuum or an inert atmosphere such as argon or other inert or rare gas or mixture. Heating of the dried gel should be at a rate less than 10° C. per minute and preferably about 2° C. per minute. Excessive heating rates result in extremely large weight losses due to premature volitization and a low yield of product. Pyrolysis temperatures in excess of 900° C. are recommended, and temperatures of between about 1200° C. and 1500° C. under flowing inert atmosphere are highly preferred to ensure complete conversion to a thermally stable products. Maximum suitable temperatures during the pyrolysis should not exceed 2500° C. because SiC itself becomes unstable. Pyrolysis temperatures of less than 900° C. are not practical because the carbothermic reduction reaction, $3C+SiO_2 \rightarrow SiC+2CO$, does not occur to a significant extent at such low temperatures.

After heat-up, the time required to pyrolyze the gel into the desired product is typically from about 2 hours to about 8 hours. Pyrolysis is considered complete when the rate of weight loss diminishes appreciably from its maximum rate. This can be established by thermo gravimetric analysis (TGA). For unsaturated R groups the rate of weight loss falls to less than one percent per hour.

Product Description

In contrast to the submicron-sized SiC powders cited earlier, the gel pyrolysis product may be described as large 100 micron irregularly shaped particles having a glassy appearance and a high degree of porosity which provides a large amount of surface area. Surface areas of the pyrolysis product as fired range from about 0.8 m$^2$/g when base-synthesized methyl trimethoxysilane gel is employed to over 600 m$^2$/g when base-catalyzed phenyl trimethoxysilane gel is pyrolyzed. In view of the glassy appearance and the absence of submicron particles, the surface area is due mainly to the presence of porosity rather than small particle size. Porosimetric analysis of the high surface area products obtained from pyrolyzed (C$_6$H$_5$SiO$_{1.5}$)n gels show that essentially all of the pore volume is associated with pores with radii less than 100 angstroms. These pores may be of differing configuration and may be interconnected in varying manner.

The surface area of the product resulting upon pyrolysis under a flowing inert atmosphere may be greatly changed by subsequent treatment to remove most of C and/or SiO$_2$.

The changes in surface area during removal of carbon and silica are linked to changes in the pore volume and pore distribution of the residue. This may be better understood by reference to Table I and Table II.

TABLE I

| Effect of SiO$_2$ Removal | As-Fired (C$_6$H$_5$SiO$_{1.5}$)n Gel | After HF Wash |
|---|---|---|
| Surface area | 226 m$^2$/gm | 877 m$^2$/gm |
| Pore volume | 0.11 cc/gm | 0.173 cc/gm |
| Pore distribution | r < 100 Å | r < 100 Å |
| Interpretation: | Removal of SiO$_2$ increased pore volume by over 50 percent through creation of or opening of very small pores which translated into the huge increase in surface area observed. | |

| Effect of Carbon Removal | As Fired (C$_6$H$_5$SiO$_{1.5}$)n Gel | After Oxid. at 700° C. |
|---|---|---|
| Surface area | 612 m$^2$/gm | 62 m$^2$/gm |
| Pore volume | 0392 cc/gm | 0.939 cc/gm |
| Pore distribution | r < 100 Å | 150 Å < r 250 Å |
| Interpretation: | Huge increase in pore volume due to carbon removal. Larger pores created or opened which translated into decrease in surface area. | |

HF etches away low surface area glassy silica phase, creating considerable additional porosity and surface area. This porosity facilitates carbon removal from the residue. Carbon removal from a low surface area, low porosity solid is exceedingly difficult. In this instance, the initial pyrolysis product may be envisioned as silicon carbide and carbon encapsulated in silica. However, as TABLE II indicates, low surface area fired products can be readily converted to high surface area materials by HF treatment.

TABLE II

| R Group | Syn. Route | S.A. as Fired | S.A.-HF Wash |
|---|---|---|---|
| Methyl | Base | 0.83 | 331 |
| Ethyl | Chloro | 1.44 | 410 |
| Propyl | Acid-base | 4.18 | 700 |

In the following examples concentrated (30% by weight) NH$_4$OH was used to adjust pH upward, concentrated (12 normal) HCl was used to acidify or adjust pH downward. All reagents were added at room temperature. Gel formation experiments were performed at atmospheric pressure in open vessels. Drying was

EXAMPLE 1

Base-Catalyzed Gel Synthesis 40 g of methyltrimethoxysilane were stirred with 21.16 g distilled water. Within minutes the mixture formed a homogenous solution to which 3.5 cc of concentrated NH$_4$OH was added, which raised the pH to approximately 9. A clear gel immediately formed, which was dried for seven hours. The final dried gel product was a white chunky powder weighing 25.72 g.

EXAMPLE 2

Chlorosilane Gel Synthesis 40 g of ethyltrichlorosilane were diluted with 80 cc of CH$_2$Cl$_2$ and stirred in an ice bath. 40 cc of distilled water were added dropwise to this solution while stirring constantly. Considerable heat evolution occurred during the water addition. Within 30 minutes, the solution formed a slurry, which solidified overnight to form a white solid and a supernatant yellow liquid. This solidified gel product was rinsed with 500 cc of water and filtered and thereafter dried for seven hours. The final dried gel product was a white powder weighing 19.47 g.

EXAMPLE 3

Acid-Base Catalyzed Gel Formation 40 g of N-Propyltrimethoxysilane were combined with 17.5 g of distilled water and 0.5 cc of acetic acid. This mixture was stirred, and within fifteen minutes a clear, homogenous solution was formed. 3 cc of concentrated NH$_4$OH were added to raise the pH to between 9 and 10. Following continued stirring of the solution overnight, a white gel with a clear supernatant liquid layer formed. The supernatant liquid was decanted away. The gel was thereupon dried for seven hours, resulting in a white chunky powder weighing 23.76 g.

EXAMPLE 4

Chlorosilane Gel Synthesis 40 g of vinyltrichlorosilane were stirred with 80 cc of CH$_2$Cl$_2$ in an ice bath. 40 cc of distilled water were added dropwise. A slurry formed, which was stirred overnight to yield a yellowish white solid with a supernatant yellow liquid layer. The solid was rinsed with distilled water and filtered and thereafter dried for seven hours. The final dried gel product was white powder having a slight brown tint, weighing 19.45 g.

EXAMPLE 5

Acid-Based Catalyzed Gel Synthesis 40 g of allyltrimethoxysilane were combined with 17.7 g of distilled water and 0.5 cc of acetic acid. Within 15 minutes, this mixture became clear. 3 cc of concentrated NH$_4$OH were added to raise the pH to between 9 and 10. Upon stirring overnight, a slightly yellow gel with a clear supernatant liquid was formed. The liquid was decanted off and the gel dried for seven hours. The final dried gel product was a yellowish white powder weighing 23.08 g.

EXAMPLE 6

Base-Catalyzed Gel Synthesis 10 g of phenyltrimethoxysilane were stirred with 1.82 grams of distilled water. Two layers formed, which were not completely miscible after an hour of stirring. Concentrated NH$_4$OH was added to increase the pH above 9. Following an additional two hours of stirring, a gel formed. This gel was dried for 7½ hours. The final dried gel product was in the form of a white powder weighing 6.83 g.

EXAMPLE 7

Base-Catalyzed Gel Synthesis 10 g of phenyltrimethoxysilane and 2.72 g of distilled water were stirred for an hour. Concentrated NH$_4$OH was added to this mixture to increase the pH above 9. In slightly less than two hours, a gel formed, which was dried for 7.5 hours. The final dried product was a white powder weighing 6.12 g.

EXAMPLE 8

Base-Catalyzed Gel Synthesis 10 g of phenyltrimethoxysilane and 5.45 g of distilled water were stirred for one hour. Thereupon, concentrated NH$_4$OH was added to increase the pH above 9. Following addition of the ammonium hydroxide, in 1½ hours a gel formed which was dried for 7.5 hours. The dried product was a white powder which weighed 6.12 g.

EXAMPLE 9

Acid-Base Catalyzed Gel Synthesis 10 g of phenyltrimethoxysilane and 1.82 g of distilled water were stirred for 5 minutes. A few drops of concentrated HCl were added, resulting in almost instantaneous formation of a clear solution with a slight amount of heat being generated. Five minutes thereafter, concentrated NH$_4$OH was added to increase the pH above 9. Following 20 minutes of continuous stirring, the solution had gelled, as evidenced by increased load on the stirring apparatus. This gel was dried for 7.5 hours. The resulting gel product was in the form of a hard white mass, which was chipped from its beaker into a powder weighing 6.65 g.

EXAMPLE 10

Acid-Base Catalyzed Gel Synthesis 10 g of phenyltrimethoxysilane and 2.72 g of distilled water were stirred together for 5 minutes. A few drops of concentrated HCl were added, and a clear solution was obtained. Five minutes thereafter, with continuous stirring, concentrated NH$_4$OH was added to increase the pH above 9. Thereafter, in about ten minutes, the solution had gelled. This gel was dried for 7.5 hours. The dried gel product was a white powder weighing 6.88 grams.

EXAMPLE 11

Acid-Base Catalyzed Gel Synthesis 10 g of phenyltrimethoxysilane and 5.45 g of distilled water were stirred together. To this mixture were added a few drops of concentrated HCl. The result was near-instantaneous formation of a clear solution. Five minutes later, with constant stirring, concentrated NH4OH was added to increase the pH above 9. Within fifteen minutes thereafter, the solution had gelled. The gel was dried for 7.5 hours. The final dried gel product was a white powder weighing 7.05 g.

EXAMPLE 12

Acid-Base Catalyzed Gel Synthesis 2.91 g of $Ni(NO_3)_2 \cdot 6H_2O$ were dissolved in 5.45 g of distilled water and stirred with 20 g phenyltrimethoxysilane. A few drops of concentrated HCl were added, resulting in formation of a homogenous yellow-green solution. Thereafter, concentrated NH4OH was added dropwise to increase the pH above 9, resulting in the formation of a light blue gel having a royal blue supernatant liquid above the gel. The supernatant liquid was decanted and the gel washed with 50 cc distilled water until the rinse water became colorless. This gel was then dried seven hours. The dried gel was light green in color.

EXAMPLE 13

Acid-Base Catalyzed Gel Synthesis 4.04 g of $Fe(NO_3)_3 \cdot 9H_2O$ were dissolved in 5.45 g distilled water and stirred with 20 g phenyltrimethoxysilane. Several drops of HCl were added, resulting in the formation of a homogenous solution. Concentrated NH4OH was thereafter added to raise the pH above 9, resulting in immediate gelation. The supernatant liquid was decanted away, leaving behind a light gold gel. After rinsing with 50 cc distilled water, the rinse water became colorless. This gel was vacuum dried for seven hours at 85° C.

until the rinse water became colorless. The gel was dried for seven hours, resulting in a purple chunky solid.

EXAMPLE 15

Acid-Base Catalyzed Gel Synthesis 4.0 g of $Cr(NO_3)_3 \cdot 9H_2O$ were dissolved in 5.45 g of distilled water and stirred with 20 grams phenyltrimethoxysilane. Concentrated HCl was added dropwise to this mixture until a homogeneous blue-black solution resulted. Upon addition of concentrated NH4OH, this blue-black solution gelled immediately. This gel was washed with 300 cc distilled water until the rinse water became colorless. The gel was then dried for seven hours, resulting in formation of a blue solid.

EXAMPLE 16

Acid-Base Catalyzed Gel Synthesis 2.42 g of $Cu(NO_3)_2 \cdot 3H_2O$ were dissolved in 5.45 g of distilled water and stirred with 20 grams phenyltrimethoxysilane. A few drops concentrated HCl were added until a homogenous solution resulted. Thereafter, concentrated NH4OH was added to the solution, causing immediate formation of a blue gel and blue supernatant liquid. This blue supernatant liquid was decanted away. The blue gel was washed with 60 cc distilled water until the rinse water became colorless. The gel was vacuum dried for seven hours at 85° C., resulting in formation of a blue solid.

The dried gel products of Examples 1–16 were thereafter pyrolyzed to 1500° C. under flowing argon atmosphere and characterized as indicated in TABLE III.

TABLE III

PYROLYSIS OF $(RSiO_{1.5})_n$ GELS

| Example | R Group | Synthesis Route | H2O to Silane Ratio | % Weight Loss on Firing | S.A. Fired | S.A. Oxid. | S.A. HF | S.A. Oxid. HF |
|---|---|---|---|---|---|---|---|---|
| 1 | Methyl | Base | 4 | 87.3 | 0.8 | — | — | 378 |
| 2 | Ethyl | Chloro | 9 | 39.8 | 1.4 | — | — | 607 |
| 3 | Propyl | Acid-Base | 4 | 64.2 | 4.2 | — | — | 765 |
| 4 | Vinyl | Chloro | 9 | 32.2 | 38.9 | — | — | 225 |
| 5 | Allyl | Acid-Base | 4 | 36.9 | 29.4 | — | — | 669 |
| 6 | Phenyl | Base | 2 | 50.2 | 246 | 115 | 562 | 94 |
| 7 | Phenyl | Base | 3 | 55.2 | 428 | 96 | 548 | 90 |
| 8 | Phenyl | Base | 6 | 58.5 | 612 | 62 | 613 | 65 |
| 9 | Phenyl | Acid-Base | 2 | 60.8 | 589 | 53 | 477 | 60 |
| 10 | Phenyl | Acid-Base | 3 | 57.7 | 496 | 118 | 623 | 126 |
| 11 | Phenyl | Acid-Base | 6 | 46.2 | 229 | 179 | 749 | 557 |
| 12 | Phenyl (Ni) | Acid-Base | 3 | — | 309 | — | — | — |
| 13 | Phenyl (Fe) | Acid-Base | 3 | — | 8.5 | — | — | — |
| 14 | Phenyl (Co) | Acid Base | 3 | — | 61.7 | — | — | — |
| 15 | Phenyl (Cr) | Acid-Base | 3 | — | 58 | — | — | — |
| 16 | Phenyl (Cu) | Acid-Base | 3 | — | 239 | — | — | — |

EXAMPLE 14

Acid-Base Catalyzed Gel Synthesis 2.91 g of $Co(NO_3)_2 \cdot 6H_2O$ were dissolved in 5.45 g of distilled water and stirred with 20 g phenyltrimethoxysilane. Concentrated HCl was added dropwise until a homogeneous solution formed. Thereafter, concentrated NH4OH was added to increase the pH above 9, which resulted in instantaneous gelation. The purple supernatant liquid was decanted away from the purple gel. The purple gel was then washed with 600 cc distilled water In TABLE III, "S.A." means surface area expressed in $m^2/g$ of product. "Percent weight loss on firing" is computed for product which has been fired at 1500° C. under flowing inert atmosphere using a heating rate of 2° C. per minute and an exposure at 1500° C. of 120 minutes. The pyrolyzed product is cooled to 25° C. before being allowed to be exposed to air. Pyrolysis is conducted at atmospheric pressure. After 120 minutes at 1500° C. the rate of weight loss for samples having unsaturated R groups had fallen to less than one percent per hour, thus indicating the carbothermic reduction reaction to be substantially complete. In contrast, samples having saturated R groups react more slowly and the weight loss rate falls to about one percent per hour after about five hours at 1500° C. Generally speaking, pyrolysis is continued for a time and at a temperature between 1200° C. and 1500° C. sufficient to result in a high surface area, open microporous partially crystalline, partially amorphous solid ceramic material. "S.A. Oxid" means surface area of the pyrolyzed product after it has been subjected to a subsequent oxidation step by exposure to air at 1000° C. "S.A. HF" means the surface area in m²/g following treatment of the pyrolysis product with aqueous hydrofluoric acid (concentration 24 weight percent) at ambient temperature and atmospheric pressure to remove $SiO_2$. "S.A. Oxid, HF" means surface area in m²/g for a dried gel which has been pyrolyzed and thereafter subjected to oxidation in air at 1000° C. to remove carbon and thereafter treated with aqueous HF (concentration 24 weight percent) to remove $SiO_2$. No set time was employed for oxidation but when a significant rate of weight increased was observed, oxidation was stopped.

Upon examination of the results contained in TABLE III, it is seen that the fired (pyrolysis) products of Examples 1–3 have very low as-fired surface areas. X-ray diffraction analysis of these products indicated them to be mostly $SiO_2$ and beta-SiC. These products did not lose weight during the oxidation step but did lose weight during the HF step. Following sequential oxidation and aqueous HF treatment, very high surface area materials resulted. These materials exhibited surface areas much higher (order of magnitude) than any of those previously known. These materials consisted mostly of beta-SiC.

Examples 4, 5 and 6–16 depict the results obtained upon pyrolysis of gels containing unsaturated R groups. Pyrolysis of gels containing unsaturated R groups such as vinyl and allyl give rise to fired products having surface areas at least an order of magnitude greater than those obtained with saturated R groups (Examples 1–3). This result occurs because the gels of Examples 4 and 5 decompose leaving more carbon available for high-temperature carbothermic reduction of $SiO_2$ to silicon carbide than gels containing saturated R groups, as illustrated by Examples 1–3. Thus, carbothermic reduction proceeds further according to the following equations:

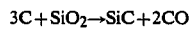

$$3C + SiO_2 \rightarrow SiC + 2CO$$

generating more porosity as CO gas is evolved. The fired products of Examples 4 and 5 are each an intimate mixture of SiC, $SiO_2$, and carbon. These samples lost weight in both the oxidation and HF treatment steps. Upon subsequent treatment of these fired products by oxidation and HF, high surface materials result which consist mostly of SiC. Gels having unsaturated R groups are a preferred embodiment of this invention due to their higher overall yield of SiC and concommitently high surface area in the fired product.

The most preferred R group is phenyl because of its unsaturated character and because it provides sufficient carbon to convert a high temperatures via carbothermic reduction of silica all of the silicon in the starting gel to SiC. The fired products of Examples 6–11 gels have surface areas an order of magnitude greater than those obtained in Examples 4–5. As evidenced by Examples 6–11, pyrolysis of $(C_6H_5SiO_{1.5})_n$ gels results in fired products having surface areas an order of magnitude greater than those obtained when R is vinyl or allyl.

The fired products from phenyl gels consisted of mixtures of beta-silicon carbide (predominant), carbon and $SiO_2$. Examples 6–11 indicate that the surface area of the fired product is not only a function of the R group but also of the synthesis conditions employed. Referring now to Examples 6–8 of TABLE III, it is seen that in these base-catalyzed gels, as the $H_2O$/silane ratio is increased, increased weight loss resulted upon firing as well as a greater surface area in the fired product. In contrast, as illustrated by Examples 9–11 which are acid-base catalyzed gel syntheses, the opposite trend was observed. IR and wet chemical analysis also indicated that the SiC content of the fired product increased as the surface area increased.

Solid state $^{29}Si$ NMR of the precursor gels also indicated that in each series, the SiC content and surface area of the fired product was greatest for the gel with the highest degree of crosslinking. The interpretation of these trends is that in highly crosslinked gels, the starting $C/SiO_2$ ratio is higher, which ultimately allows the carbothermic reduction reaction to produce SiC to proceed further. The greater the extent of the carbothermic reduction, the more CO is evolved and the greater the degree of porosity which is generated. The high degree of porosity translates into the very high surface areas observed.

The as-fired products in Examples 6–11 were susceptible to dramatic changes in surface area during the purification steps to remove carbon and silica. As discussed earlier, these changes in surface area are linked closely to changes in the porosity and pore distribution of the product. Oxidation typically resulted in a decrease in surface area and the loss in surface area was greatest for fired samples having with the highest surface areas. HF treatment increased the surface area of the residues, particularly for the fired products with lower surface areas. The combination of oxidation and HF generally gave surface areas close to those obtained by oxidation alone.

These observations are readily explainable if one understands that the lower surface area pyrolysis products contain relatively more $SiO_2$ and are more susceptible to an increase in surface area upon treatment with HF. In contrast, the higher surface area residues contain relatively less $SiO_2$, are more porous and are more susceptible to a decrease in surface area upon oxidation.

The results given in Table III illustrate the wide range of surface area available as well as the influence of gel synthesis conditions, particularly base versus acid-base synthesis and the $H_2O$/silane ratio employed during gel synthesis on the surface area of the fired products.

Examination of the fired products of Table III indicates that crystallinity of the silicon carbide in the fired product is also affected by synthesis conditions. This observation is based on comparison of Examples 8 and 11. Base-catalyzed Example 8 gel when pyrolyzed resulted in a highly crystalline product, whereas acid-base catalyzed gel of Example 11 when pyrolyzed resulted in the least crystalline product. The silicon carbide in each is mostly beta phase with a trace amount of alpha phase. Morphological examination of the residue after oxidation and treatment with HF indicated the presence of both whiskers and crystallites of SiC.

High surface area pyrolysis products—mixtures of SiC, C and $SiO_2$—must be used in an inert or reducing atmosphere or an oxidizing atmosphere below 500° C.

Exposure to an oxidizing atmosphere above 500° C. would remove carbon and result in loss in surface area. However, even oxidized samples can have surface areas in excess of 50 m²/gm which is still very acceptable for a catalyst support.

Products according to the invention are advantageous at high temperatures where other catalyst supports would undergo a serious loss on surface area. Zeolites would decompose to very low surface area materials if used for methane pyrolysis above 1000° C. Many silicas and aluminas would also have very low surface areas in these temperature regions. For example, a silica gel prepared by hydrolysis of TMOS (tetramethylorthosilicate, $Si(OCH_3)_4$) with a surface area of 691 m²/gm at 150° C. displayed a decrease in surface area to only 23 m²/qm when heated to 950° C. A similar loss in surface area for $SiO_2$ has been shown by Brinker et al in Journal Non Crystalline Solids 48, 47, 1982, (Hench, L. & Park S., Poster Session #4, 2nd Intl. Conf. on Ultrastructure Processing, 2/25-3/1/85, Palm Coast, Fla.)

If the pyrolysis product or purified pyrolysis product is to be used as a catalyst support material, catalytically active metals and/or promoters may be introduced subsequent to pyrolysis by conventional techniques such as impregnation from solution.

As demonstrated by Examples 12-16, transition metal salts such as metal nitrates can be readily and homogenously incorporated into the $(RSiO_{1.5})_n$ gels during synthesis of the gel. High surface area metal-containing catalysts can be conveniently prepared by homogenously incorporating a suitable metal salt or a plurality of such salts in the synthesis gel. Upon controlled pyrolysis of these gel products, high surface area transition metal-containing materials are generated. Such materials may be used directly as catalysts or as support for other active catalytic materials. The acid-base synthesis procedure using alkoxysilanes is particularly useful for the incorporation of metal-containing components in the gel.

The foregoing Examples and discussion thereof illustrate the versatility of the process according to the present invention for, inter alia, preparing catalyst and catalyst support materials.

Suitable silanes such as those utilized in Examples 1-16 are available from Petrarch Systems, Inc. of Bristol, Pa. Pore volume data was obtained using a Quantichrome-Autoscan 60 mercury porosimeter and ASTM Method No. D4284. The surface area numbers presented were obtained by the B.E.T. method using a Quantichrome-Monosorb instrument using single point nitrogen analysis and a dynamic flow method. The relevant ASTM Method is D 4567-86.

We claim:

1. A method for forming a high surface area, open microporous partially crystalline, partially amorphous solid ceramic material consisting essentially of silicon carbide comprising:
   (a) synthesis of a gel having the idealized formula $(RSiO_{1.5})_n$ wherein R equals vinyl, allyl, or phenyl, the gel being three dimensionally cross linked;
   (b) heating the gel at a rate of less than 10° C. per minute to a temperature of between 1200° C. and 1500° C. in an inert atmosphere and maintaining the temperature in the prescribed range until carbothermic reduction reaction to produce SiC proceeds to result in a high surface area, open microporous partially crystalline, partially amorphous solid ceramic material and thereafter reducing the temperature to ambient while maintaining the material in an inert atmosphere.

2. The method of claim 1 wherein the gel is dried prior to the step of heating.

3. The method of claim 1 wherein the gel is prepared from alkoxy silanes having the general formula $RSi(OR')_3$ wherein R is a saturated or unsaturated hydocarbon group containing less than ten carbon atoms and R' is a saturated alkyl group containing less than five carbon atoms.

4. The method of claim 2 wherein the gel is prepared by acid-catalyzed hydrolysis followed by base-catalyzed condensation.

5. The method of claim 2 wherein the gel is prepared by base-catalyzed hydrolysis and condensation.

6. The method of claim 1 wherein the gel is prepared from chlorosilanes having the general formula $RSiCl_3$ wherein R is a saturated or unsaturated hydrocarbon group containing less than ten carbon atoms.

7. The method according to claim 2 wherein the dried gel is heated at a rate not exceeding 2° C. per minute while in the temperature range of 300° C. to 1500° C.

8. The method according to claim 4 wherein the inert atmosphere is deficient of nitrogen and oxygen.

* * * * *